United States Patent [19]

Silberberg et al.

[11] 4,171,529
[45] Oct. 16, 1979

[54] PHASE CONTROLLED SHUTTERING SYSTEM

[75] Inventors: George G. Silberberg; Pat N. Keller, both of Ridgecrest; Richard O. White, China Lake, all of Calif.

[73] Assignee: The United States of America as represented by the Secretary of the Navy, Washington, D.C.

[21] Appl. No.: 903,339

[22] Filed: May 5, 1978

[51] Int. Cl.² ............................................. H04N 5/26
[52] U.S. Cl. .................................. 358/209; 358/215; 358/225
[58] Field of Search .................. 358/93, 99, 225, 209, 358/215

[56] References Cited

U.S. PATENT DOCUMENTS 2,774,815  12/1956  Gillette .............................. 358/215

OTHER PUBLICATIONS

Instar Sales Brochure–Video Logic Corp., Oct. 1977.

Primary Examiner—Robert L. Richardson
Attorney, Agent, or Firm—R. S. Sciascia; W. Thom Skeer; T. R. Schulte

[57] ABSTRACT

A shuttering servo system which is phase synchronized to the vertical retrace time of a television camera. Circuitry is provided to lock the leading edge of the signal from a photo detector on a disc shutter motor shaft to the leading edge of the camera's vertical drive output. A form of tachometer feedback is used to stabilize the circuit.

8 Claims, 4 Drawing Figures 4,171,529

PHASE CONTROLLED SHUTTERING SYSTEM

BACKGROUND OF THE INVENTION

1. Field of the Invention

This invention pertains to the field of telegraphy. More particularly, this invention pertains to television systems. In still greater particularity, this invention pertains to a shutter synchronizer system. By way of further characterization, but not by way of limitation thereto, the invention utilizes a shutter servo system to expose the video tube of a television camera for a fixed period during the camera's vertical retrace time.

2. Description of the Prior Art

In a conventional video camera, incident light continuously exposes the light sensitive material on the face of the video tube. Some electrical property, usually the conductance, of this light sensitive material is changed in accordance with the exposure of the face to the image. This changed property is in turn sensed by a scanning electron beam so that the potential at the output grid of the tube varies in accordance with the amount of light that exposes each point. The electron beam also restores the light sensitive material to its unexposed condition.

In a standard video camera, the electron beam scans the entire face each 16.67 msec. with 243 equally spaced lines producing a field. Thus, the exposure time of each point on the face of a standard video camera is 16.67 msec. with each point on the face being scanned and erased at a different time. In order to provide greater clarity the electron beam in a standard camera produces two interlaced fields. The two fields constitute a frame. The frame is changed at a rate which, due to the persistence of vision, results in the illusion of motion. These two facts make a standard video camera unsuitable for filming high speed events, that is, movement between field scans results in a blurred image due to object displacement.

If a light shutter is placed in front of the face of the video tube the exposure time can be reduced to as low as 0.1 msec. The electrical impression of the image remains until scanned by the electron beam. With such a shutter high speed events may be filmed. However, if the shutter is not synchronized with the scanning electron beam, then exposures will occur during the time the face is being scanned. Exposure during the scan period results in blurred or multiple images and renders non-synchronized shutters less than satisfactory for filming high speed events.

It would be desirable to have a shutter synchronized to expose the face of the video tube only during the time between scans of the electron beam, herein called the vertical retrace period. This allows for filming of high speed events. While shuttered video cameras have been available for years, they require manual synchronization and, once synchronized, they may lose their synchronization during use resulting in unsatisfactory pictures. A system providing automatic, stable, and very precise synchronization is highly desirable.

SUMMARY OF THE INVENTION

The invention employs two disc shutters, a driving mechanism, and electronic control circuits. The electronic servo or control circuit automatically and precisely controls the position of the shutters. When used with a television camera, the shutter system exposes the video tube at a fixed time during the camera vertical retrace time. The control circuits perform this function by synchronizing the leading edge of the signal from a photo detector on the shutter motor shaft with the leading edge of the camera's vertical drive output. The shutters may be adjusted mechanically so that various effective exposure times can be achieved.

The electronic servo or control circuit utilizes a phase detector which compares the shutter position signal from a photo detector mounted on the shutter motor shaft with the signal from the camera indicative of the vertical retace. Suitable amplification is provided in conjunction with tachometer voltage feedback to eliminate oscillations and to produce a more stable, fast, and accurate servo loop. Synchronization is indicated by a synchronization designator.

DESCRIPTION OF THE PREFERRED EMBODIMENT

Figure 1:
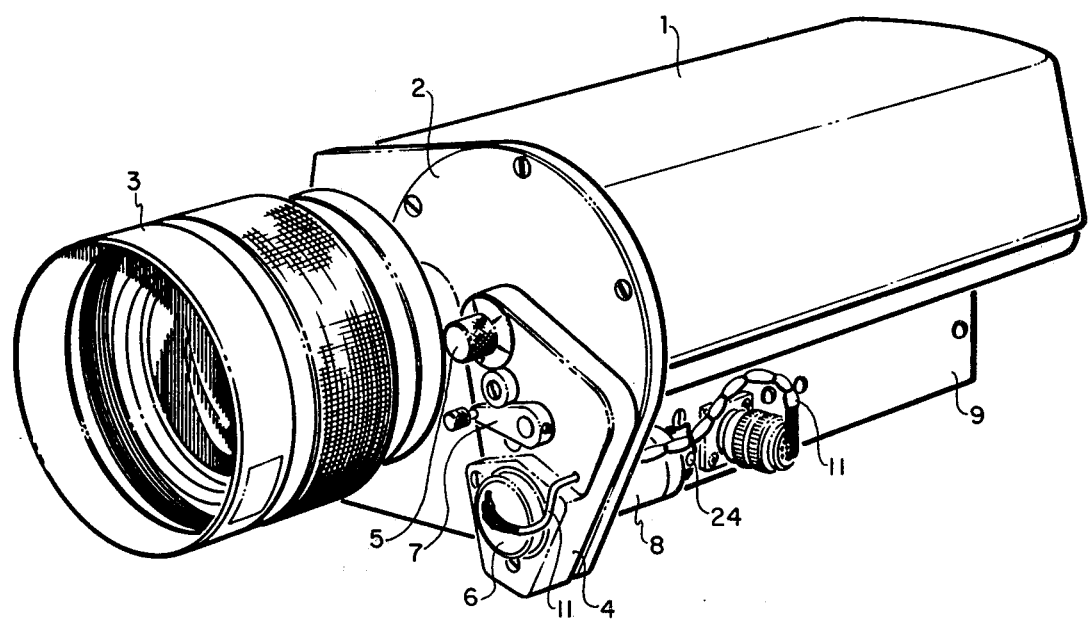
FIG. 1 shows an assembled, shuttered television camera.

Referring to FIG. 1, the invention is shown as assembled with a television camera 1. Shutter housing 2 is mounted on the front of camera 1 behind lens 3. Front cover 4 is mounted on shutter housing 2 with adjustable shutter disc center shaft 5 extending through cover 4. Semaphore housing 6 and shutter brake handle 7 are mounted on the face of front cover 4. A driving mechanism 8, which may be a motor, is mounted behind shutter housing 2. Control or servo circuit housing 9 is mounted below camera 1. Wires 11 connect semaphore (not shown) to the control circuitry inside circuit housing 9. A synchronization designator 24, which may be a light emitting diode, is mounted on circuit housing 9.

Figure 2:
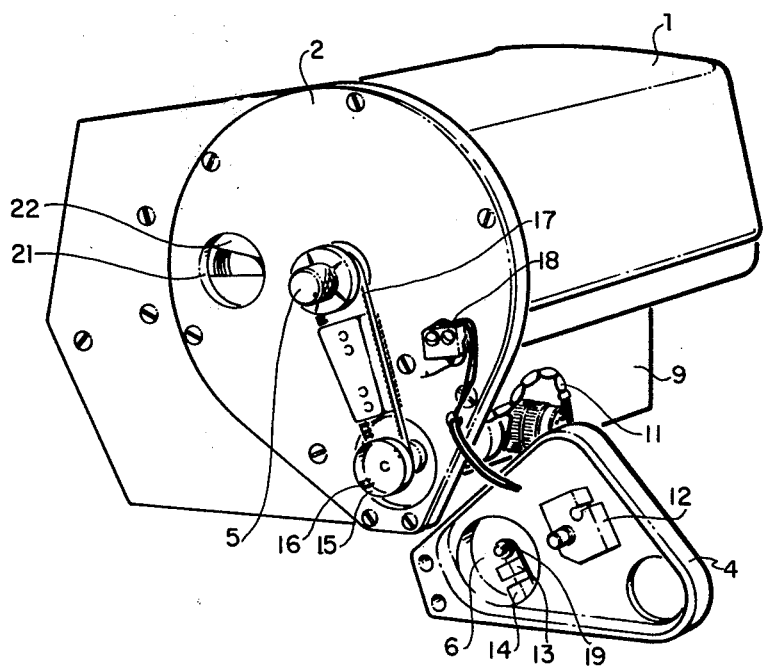
FIG. 2 shows a camera with the lens removed and the front cover of the shutter housing removed.

Referring to FIG. 2, the system is shown with lens 3 and front cover 4 removed. The back side of front cover 4 is shown with shutter brake 12, which is joined to shutter brake handle 7 (on the front side). On the inside of semaphore housing 6 is mounted a semaphore 19 comprised of light source 13 and photo detector 14. A slotted cup 15 is mounted on the shaft of motor 8 such that, when front cover 4 is connected to shutter housing 2, the wall of slotted cup 15 extends between light source 13, which may be a photo diode, and photo detector 14, which may be a photo transistor. Slotted cup 15 has slots 16. Belt drive 17 engages the shaft of motor 8 and the adjustable shutter disc center shaft 5. Wires 11 connect shutter lock microswitch 18, and semaphore 19 with the control or servo circuitry in circuit housing 9. Lens opening 21 in shutter housing 2 shows shutter 22 in position to allow light to enter camera 1.

Figure 3:
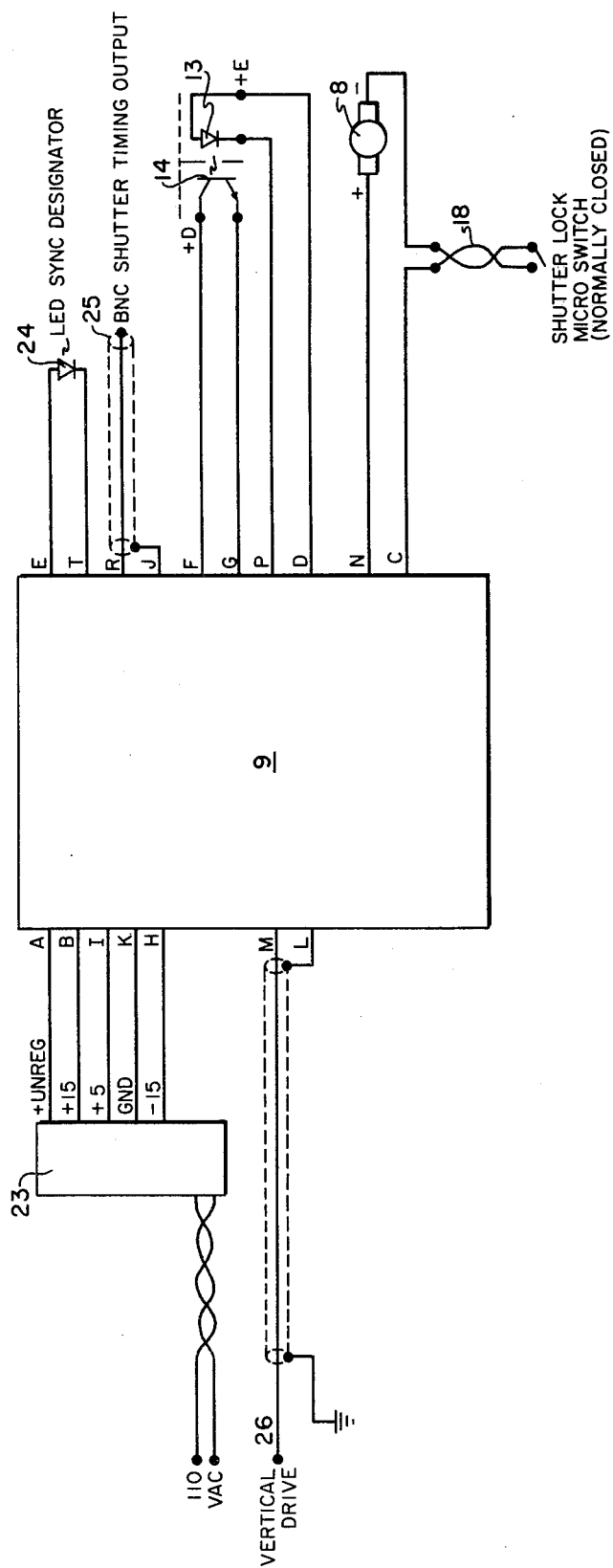
FIG. 3 shows the wiring diagram of the shutter system.

Referring to FIG. 3, which shows the wiring diagram of the shutter system, a standard 110 volt AC source is connected to a power supply 23 which is in turn connected to circuit housing 9 and thence to the control or servo circuitry (not shown). A vertical drive input 26 from television camera 1 (FIGS. 1 and 2) is also connected to the control or servo circuitry via circuit housing 9. Synchronization designator 24 is also connected to the control or servo circuitry through circuit housing 9. Similarly, light source 13, photo detector 14, motor 8, and shutter lock switch 18 are suitably wired into the control or servo circuitry through circuit housing 9.

Figure 4:
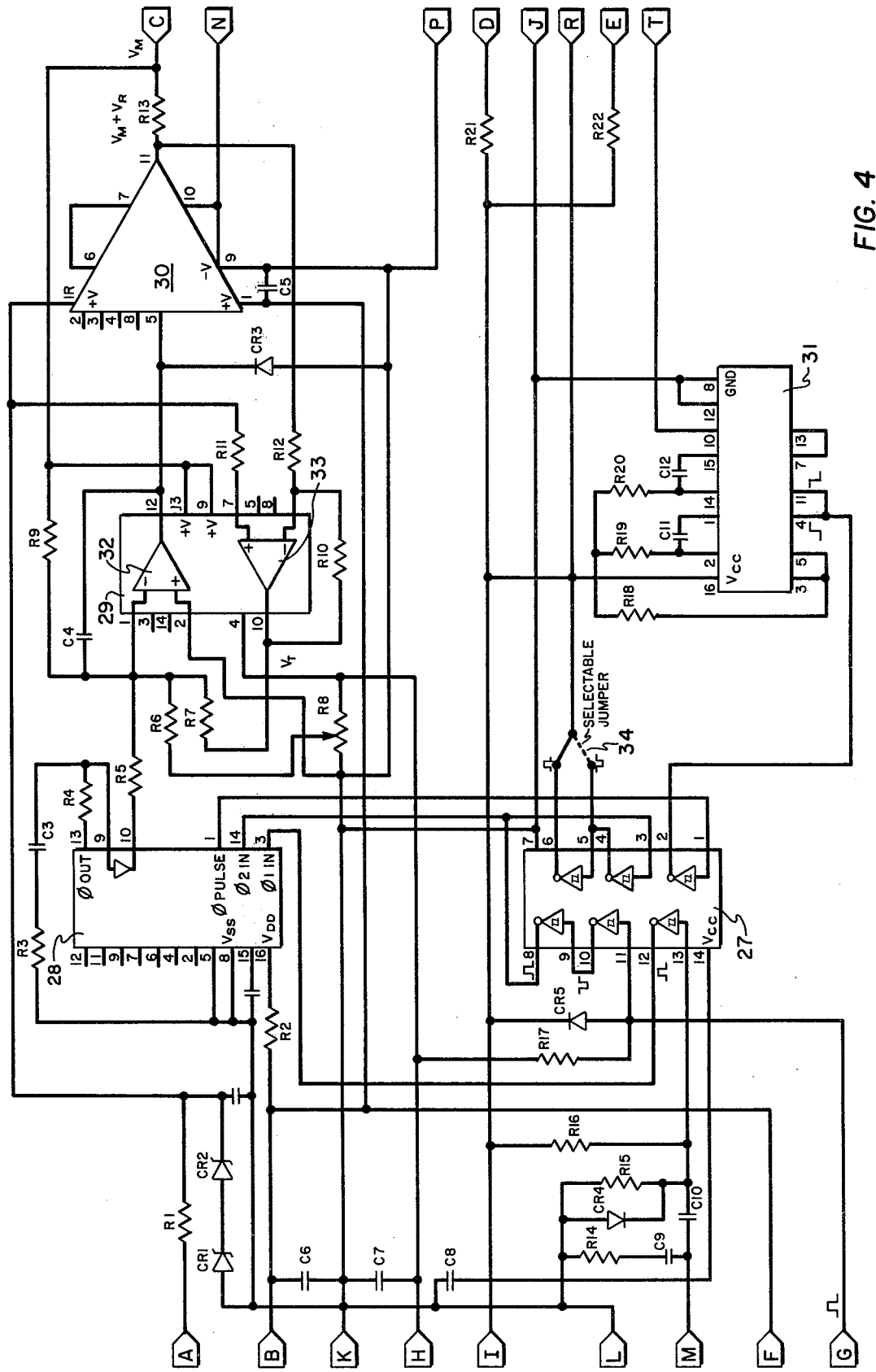
FIG. 4 shows the control or servo circuit schematic.

Referring to FIG. 4, wherein the control or servo circuit schematic is shown, inputs A, B, K, H, and I feed power to the circuit from power supply 23 (in FIG. 3). Inputs L and M are connected to the television camera vertical drive output 26 (in FIG. 3). Inputs F and G are connected to the photo detector 14 (in FIG. 3) while P and D are connected to the light source 13 (in FIG. 3). Inputs N and C are connected to motor 8 and microswitch 18 (both in FIG. 3). Synchronization designator 24 (in FIG. 3) is connected to the circuitry through inputs E and T while inputs R and J allow the output of photo detector 14 (in FIG. 3) to be made available through BNC connector 25 (in FIG. 3). The output is buffered to prevent loads on it from interferring with the servo operations and its polarity is selectable by means of a soldered selectable jumper 34.

A Schmitt trigger 27, phase detector 28, dual operational amplifier 29 having upper operational amplifier 32 and lower operational amplifier 33, high power follower amplifier 30, and dual monostable multivibrator 31 are included in the circuit. Resistors, hereinafter designated as R followed by a number, capacitors, hereinafter designated as C followed by a number, and diodes hereinafter designated as CR followed by a number complete the circuit.

MODE OF OPERATION

Referring to FIG. 1, shutter disc center shaft 5 allows the shutter to be adjusted mechanically so that various effective exposure times can be achieved. A range of times from 0.002 sec to 0.0001 sec has proven satisfactory. The level of light available through the light gathering optics determines which shutter to use. The adjustment is possible because two disc shutters are used. One shutter has two large slots 180° opposed which the other disc shutter has a variety of slots of different widths such that, when co-axially mounted, the shutters allow an exposure time variation over a large range.

An industrial tube, known as a PLUMBICON r, which is interchangeable with the vidicon tube in camera 1, was used with the present invention. This tube was selected because of its response characteristics and imaging qualities. However, any suitable television camera tube may be used. One modification which may be made to camera 1 is to fix the target voltage at a constant level which prohibits the camera from adjusting for varying light intensities.

If it is desired to use the camera in its normal mode then brake 7 is engaged to lock the disc shutters in a stationary position. Shutter disc center shaft 5 is then adjusted to allow the widest shutter opening to be selected and microswitch 18 is opened to disengage the synchronizing circuitry.

Referring to FIG. 2, when front cover 4 is attached to shutter housing 2, photo detector 14 and light source 13 are on opposite sides of the wall of slotted cup 15. Light source 13 emits a continuous beam of energy waves which are only recognized by photo detector 14 when slots 16 in slotted cup 15 pass between light source 13 and photo detector 14. Because slotted cup 15 is mounted on the shaft of motor 8 which is in turn coupled to shutter disc center shaft 5, the system is assembled such that a signal is outputted through photo detector 14 each time the openings in shutter discs 22 pass lens opening 21.

Referring to FIG. 4, vertical drive input L and M are impedance matched by R14 and C9. Capacitor C10, AC couples the negative 4 volt vertical drive pulse from input M to pin 13 of Schmitt trigger inverter 27 which may be of the low power Shottky variety. Trigger inverter 27 is biased in the high state (at approximately 2.75 volts) by R15 and R16. The positive output pulse goes to a first phase input (pin 3) of phase comparitor 28. When photo transistor 14 (in FIG. 3) turns on, pin 11 of Schmitt trigger 27 is pulled high. Pin 11 of Schmitt trigger 27 is clamped from going higher than the plus 5 volt supply by CR5. The output of the pin 11 inverter re-enters Schmitt trigger 27 at pin 9, is inverted again, and then fed to a second phase input (pin 14) of phase detector 28.

The output (pin 13) of phase detector 28 goes to R4, C3, and R3 which functions as an integrator with compensation. The output of this circuit is fed to pin 9 of phase detector 28 and is buffered by an internal buffer and outputted at pin 10. The signal is then fed through R5 to an input of the main servo amplifier 32 which is the upper operational amplifier of dual operational amplifier 29. The output of upper operational amplifier 32 is buffered by power amplifier 30 to increase power driving capabilities. The output stage of power amplifier 30 is operated between 0 and +15 volts to reduce power dissipation. Dual operational amplifier 29 and the input stage of power amplifier 30 are operated on +18 volts and +15 volts to increase the linear range of the circuit. Power amplifier 30 is heat sinked by pressing against an aluminum plate at the bottom of circuit housing 9 (FIG. 1).

Phase detector 28 has an output (pin 1) which is proportional in duration to the phase mis-match of the input (pins 14 and 3). This ouput is used to indicate proper operation of the servo system. The output of pin 1 is first buffered by Schmitt trigger 27 (input at pin 1 output at pin 2 of trigger 27), and then fed to monostable multivibrator 31. The left one shot (pin 4) of monostable multivibrator 31 disables the input to the right one shot (pin 11) for 100 microseconds after the left input (pin 4) has detected a rising edge. Thus, if the falling edge of the phase detector pulse, which the input (pin 11) to the right one shot of monostable multivibrator 31 is sensitive to, occurs within 100 microseconds of the rising edge, the right one shot (pin 11) of monostable multivibrator 31 will not trigger and synchronization designator 24 (in FIG. 3), hooked between +5 and Q, will be constantly lit. If pulses from phase detector 28 are of greater duration than 100 microseconds, than the right one shot, pin 11, will be triggered and synchronization designator 24 (in FIG. 3) will begin to blink to indicate a non-synchronized condition.

R8, an adjustable input to operational amplifier 32 is used to set the range of motor speed in which the circuit will function. To set R8, it is first varied through its range until synchronization is achieved. Once synchronization occurs R8 is adjusted until 2.3 volts is observed at pin 9 of phase detector 28 with a very high input impedance (greater than 10 Mohms) voltmeter. In addition to the synchronization designator 24, the synchronization of the system can also be observed on a dual trace oscilloscope by connecting the vertical drive signal, inputs L and M, to one channel and the shutter strobe signal, inputs J and R on BNC connector 25 (FIG. 3), to the other channel. The vertical drive signal is a negative pulse and for viewing it may be desirable to invert it on the oscilloscope.

In order to provide a more stable, fast, and accurate servo circuit, tachometer feedback voltage is used. Conventional tachometer voltage systems use a tachometer mechanically coupled to the motor. The present invention utilizes a virtual tachometer voltage which is obtained by computing the back EMF of the motor. This is accomplished by sensing the motor voltage and subtracting a voltage equal to the armature IR drop. R10, R11, R12, R13, and lower operational amplifier 33 of dual operational amplifier 29 performs this function. Pin 10 of dual operational amplifier 29 is then equivalent to tach feedback.

The resistance values for R10, R11, R12, and R13 are selected by utilizing the following virtual tach analysis. Referring to FIG. 4, it is assumed that all currents into operational amplifier 33 are negligible when compared with the motor current. R11 does not enter into the gain equation, its purpose being to reduce input offset drift due to changes in bias current. The induced voltage ($V_{ind}$) in the motor is equal to KW where K is a constant and W is the revolutions per second of the motor. $V_m$, the voltage at the motor input C is equal to the induced voltage ($V_{ind}$) plus the current I times the armature resistance ($R_{arm}$) which is known for a given motor. The equation is $V_m = V_{ind} + IR_{arm}$. $V_{ind}$ is then: $V_{ind} = V_m - IR_{arm}$. The virtual tachometer voltage ($V_t$) is equal to:

$$V_t = V_m \frac{R_{12} + R_{10}}{R_{12}} - (V_m + V_r)\frac{R_{10}}{R_{12}} = V_m - V_r\frac{R_{10}}{R_{12}}$$

where $V_r = IR_{13}$. Setting $V_{ind}$ equal to $V_t$ the equation reduces to: $R_{arm}/R_{13} = R_{10}/R_{12}$ which is then the necessary condition for $V_t = V_{ind}$. For a given motor $R_{arm}$ is known. In the present invention $R_{arm}$ is 13 ohms and $R_{13}$ is chosen to be 1 ohm. The ratio $R_{10}/R_{12}$ must be 13 to make $V_t = V_{ind}$. The equivalent of tachometer feedback is thus obtained without requiring either motor modification or a tachometer.

The steady state error of the servo system is independent of the load, therefore the position of the shutter during synchronization is independent of the friction load, providing the frictional load is within the system drive capabilities. The tension of the belt 17 between motor 8 and shutter disc center shaft 5 greatly affects the friction load and hence the power and current requirements of motor 8. With proper belt tension the motor current should be between 60 and 110 milliamps. The motor current can be read by means of a clip on milliammeter, or reading the voltage across R13 with a floating volt meter (V=I since R=1 ohm), or by disconnecting a motor lead and inserting a milliam-meter. If the voltage across R13 is measured, both leads of the voltmeter must be floating from ground or damage to high power follower amplifier 30 will result.

Use of the present invention assures automatic, stable, and very precise shutter synchronization. An added benefit of the precise shutter synchronization is that the time of exposure can be determined simply and accurately. When the present invention is used, motion blur is eliminated from the images formed on a video tube, making it possible to use these images for measurement purposes.

When used for obtaining data from video images the invention makes television preferable to movie film and cameras. The fact that video images are electronically processed means that these same images can be processed directly through a computer and yield answers within seconds of the event, thus eliminating the cost and time factors associated with film and cameras. This also allows for a determination of exact exposure time and insertion of other real time data. In addition, utilization of this invention could allow a number of television cameras to be synchronized one to another or to an outside clocking pulse.

The foregoing description, taken together with the appended claims, constitutes a disclosure such as to enable a person skilled in the electrical and mechanical engineering arts and having the benefit of the teachings contained therein to make and use the invention. Further, the structure herein described constitutes a meritorious advance in the art which is unobvious to such skilled workers not having the benefit of these teachings.

What is claimed is:

1. A phase control shuttering system comprising:
   a driving mechanism;
   two disc shutters, mounted on said driving mechanism;
   semaphore means, coupled to said driving mechanism, for signaling the position of said shutters; and
   servo circuit means, coupled to said semaphore means and to a television camera, for adjusting the rotation of said shutters;
   whereby said shutters are phase synchronized with the vertical retrace time of said television camera.

2. Shuttering system according to claim 1 wherein said semaphore means includes:
   a light source providing energy waves;
   a photo detector mounted so as to detect said energy waves; and
   a slotted cup, mounted on said driving mechanism such that the slots in said cup allow energy waves from said light source to fall upon said photo detector.

3. Shuttering system according to claim 1 wherein said servo circuit means includes:
   a Schmitt trigger;
   a phase detector, connected to said Schmitt trigger; and
   virtual tachometer voltage means, connected to said phase detector and to said driving mechanism, for stabilizing said servo circuit means by supplying the back emf of said motor.

4. Shuttering system according to claim 3 wherein said virtual tachometer voltage means includes an operational amplifier in a resistance network.

5. Shuttering system according to claim 3 further including an indicating means, connected to said phase detector, for signaling that said shutter system is phase synchronized with the vertical retrace time of the aforesaid television camera.

6. Shuttering system according to claim 5 wherein said indicating means includes:
   a monostable multivibrator; and
   a synchronization designator, connected to said monostable multivibrator.

7. Apparatus for obtaining tachometer voltage in a motor driven television camera shutter apparatus comprising:
   an operational amplifier, having a positive and a negative input and a single output;
   a first resistor, connected to said motor and to the positive input of said amplifier;
   a second resistor, connected to said motor;

a third resistor, connected in series with said second resistor and connected to the negative input of said amplifier; and a feedback resistor having one lead connected to said single output of said amplifier and one lead connected to said negative input of said amplifier.

8. Apparatus for obtaining motor tachometer voltage according to claim 7 wherein said feedback resistor has a resistance value such that the ratio of the resistance of said feedback resistor to said third resistor is equal to the armature resistance value of said motor divided by the resistance value of said second resistor.

* * * * *